United States Patent [19]
Frohlich

[11] Patent Number: 6,101,974
[45] Date of Patent: Aug. 15, 2000

[54] COMBINATION PET WATER BOTTLE AND BOWL

[76] Inventor: Francine P. Frohlich, 123 Majestic Ave., San Francisco, Calif. 94112

[21] Appl. No.: 09/492,680

[22] Filed: Jan. 27, 2000

[51] Int. Cl.$^7$ .................................................. A01K 7/00
[52] U.S. Cl. ............................. 119/51.5; 119/72; 119/77
[58] Field of Search ............................. 119/51.5, 53, 72, 119/74, 77, 78

[56] References Cited

U.S. PATENT DOCUMENTS

| | | | |
|---|---|---|---|
| 2,790,417 | 4/1957 | Brembeck | 119/72 |
| 4,192,256 | 3/1980 | Clugston | 119/77 |
| 4,470,371 | 9/1984 | Strickland | 119/78 |
| 5,105,768 | 4/1992 | Johnson | 119/72 |
| 5,738,039 | 4/1998 | Berman et al. | 119/72 |
| 5,884,580 | 3/1999 | Faircloth, Jr. | 119/51.5 |

Primary Examiner—Peter M. Poon
Assistant Examiner—Elizabeth Shaw

[57] ABSTRACT

Combination pet water bottle and bowl with a molded plastic vessel capable of retaining water or other liquid having one flat wall and an opposing parallel second wall having a bowl shaped depression integral to the second wall, a replaceable and removable cap integral to the vessel to enable the user to fill the vessel with water or the like, a spring biassed water sealing valve assembly comprised of a resilient stopper and a slidable valve stem that allows water to pass from the inside of the vessel to the bottom of the bowl by use of a pull handle located at the top of the valve stem external to the vessel body, a means of locating the valve assembly so that the vessel can be blow molded using common molding techniques without the need to glue or weld two vessel halves together, and a molded in device for attaching a shoulder strap to the vessel.

1 Claim, 5 Drawing Sheets

COMBINATION PET WATER BOTTLE AND BOWL

BACKGROUND OF THE INVENTION

This invention relates generally to the field of bottles, and more particularly to a combination pet water bottle and bowl.

It is a common problem that when a pet owner takes a pet out of the home environment for an extended period of time, it may become necessary to carry a water bottle or the like as well as a water bowl so that the pet can drink water as it becomes thirsty. This method of carrying a water bottle and a separate bowl can be cumbersome in that two separate items need to be transported rather than one.

Additionally, a traditional bowl, whether constructed of plastic or metal, tends to be relatively light in weight and can therefore be easily knocked about by a larger pet such as a large dog.

SUMMARY OF THE INVENTION

The primary object of the invention is to provide a portable water retaining vessel that incorporates a bowl shape molded one side of the vessel wall.

Another object of the invention is to provide a combination water retaining vessel and bowl in which the user can pull a knob located on the outside of the vessel that activates a valve assembly that causes water stored inside the vessel to pour into the integral horizontally positioned bowl portion of the vessel wall.

A further object of the present invention is to provide a constructions means that makes it possible to blow mold the vessel in one integrated shape without having to cut the shape in half to install the valve assembly.

A further object of the present invention is to provide a molded in means of attaching a shoulder strap.

Other objects and advantages of the present invention will become apparent from the following descriptions, taken in connection with the accompanying drawings, wherein, by way of illustration and example, an embodiment of the present invention is disclosed.

Combination pet water bottle and bowl comprising: a molded plastic vessel capable of retaining water or other liquid having one flat wall and an opposing parallel second wall having a bowl shaped depression integral to said second wall, a replaceable and removable cap integral to said vessel to enable the user to fill the vessel with water or the like, a spring biassed water sealing valve assembly comprised of a resilient stopper and a slidable valve stem that allows water to pass from the inside of the vessel to the bottom of the bowl by use of a pull handle located at the top of the valve stem external to the vessel body, a means of locating said valve assembly so that said vessel can be blow molded using common molding techniques without the need to glue or weld two vessel halves together, and a molded in means for attaching a shoulder strap to said vessel.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
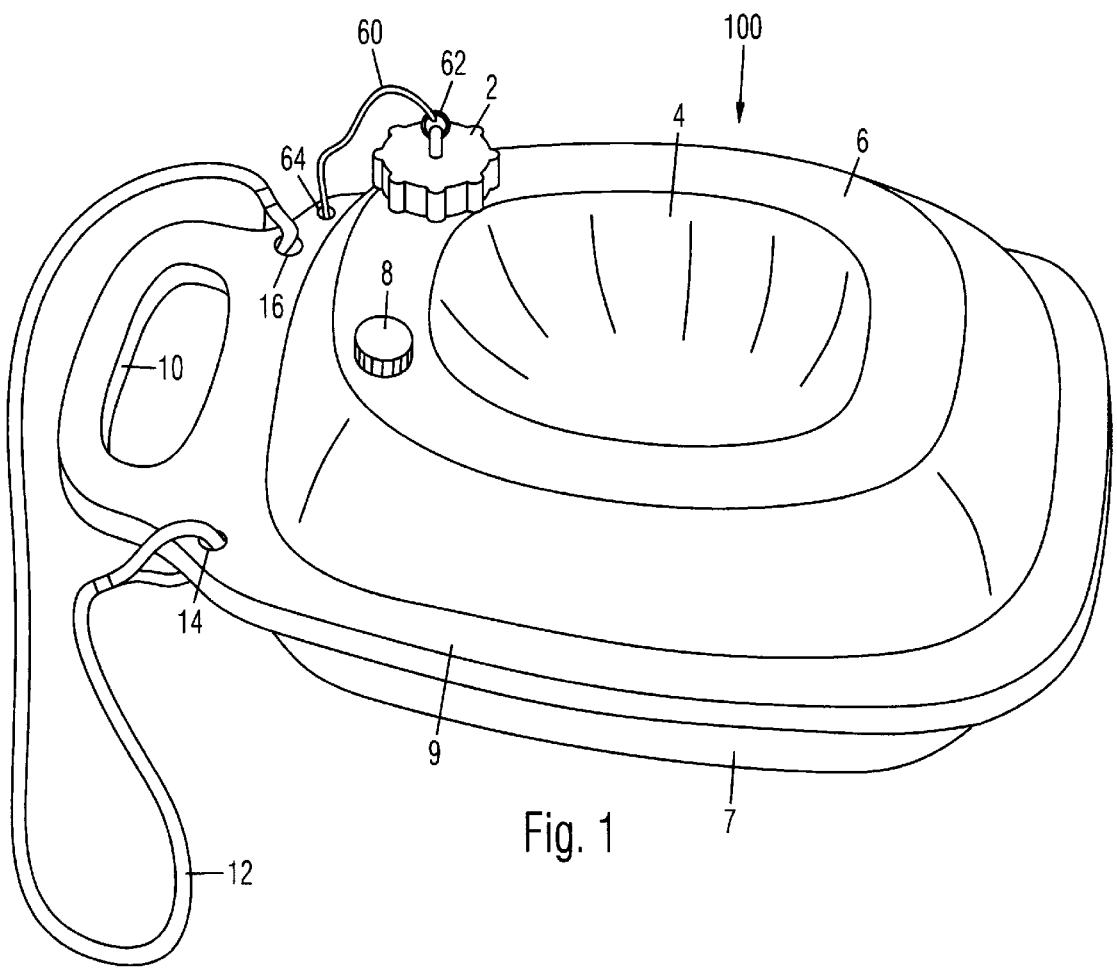
FIG. 1 is a perspective view of the present invention

Referring now to FIG. 1 we see a perspective view of the pet water bottle 100 of the present invention. One surface 6 of the bottle has a depressed bowl shape 4. The other side 7 is flat and is designed to be placed in a horizontal fashion on the ground or floor. Water cap 2 is removable and replaceable. Molded in cable retainer 62 located at the center of cap 2 has a cable 60 attached to it which is then fastened through an aperture 64 located on the flange portion 9 of bottle 100. Apertures 14, 16 allow a shoulder strap 12 to be fastened to bottle 100. An elliptical opening 10 is molded into flange 9 to create a hand hold portion. When knob 8 is lifted, water stored inside bottle 100 flows into bowl 4.

Figure 2:
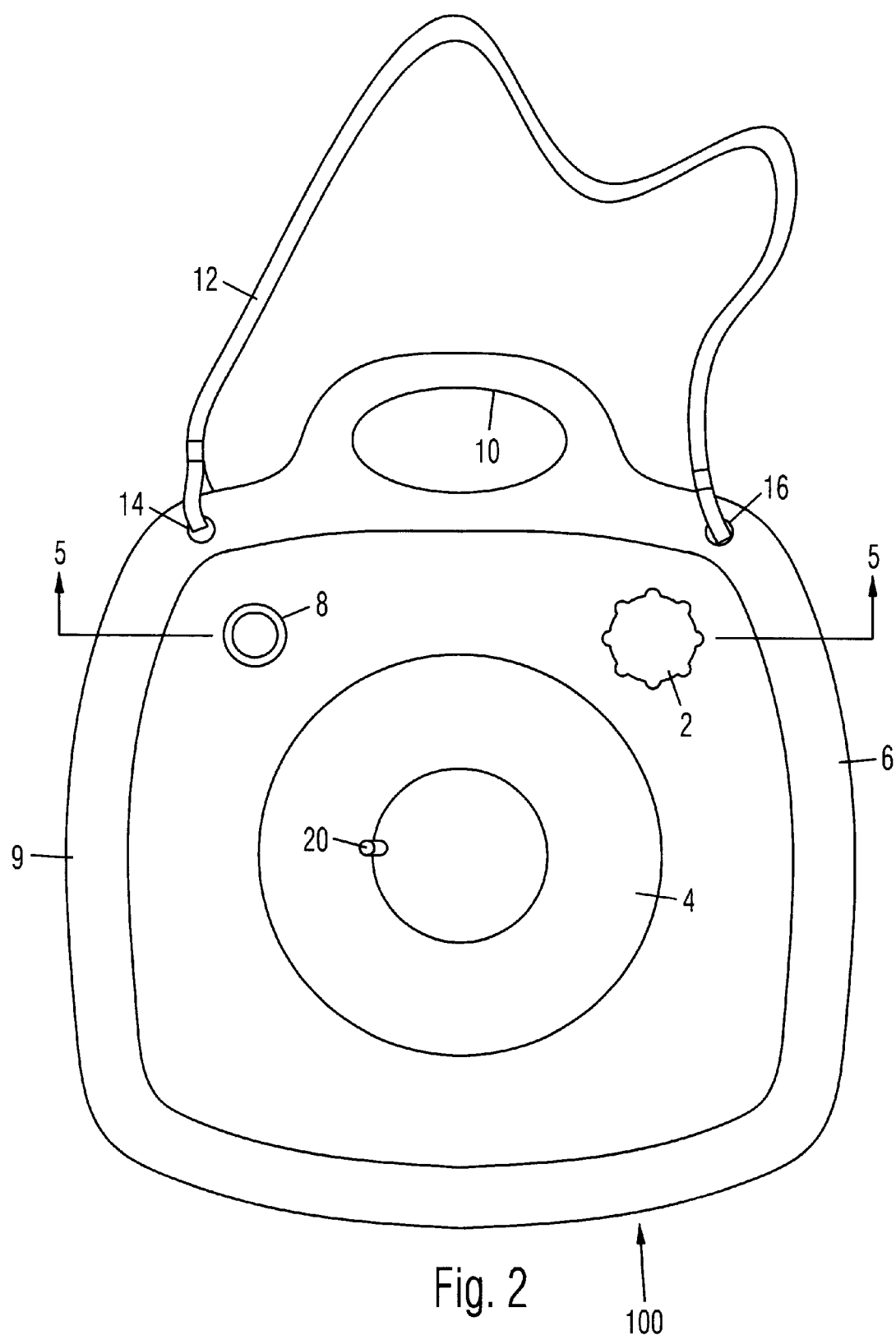
FIG. 2 is a plan view of the present invention

FIG. 2 shows a plan view of the present invention. Section line 50 defines the view shown in FIG. 4 and FIG. 5.

Figure 3:
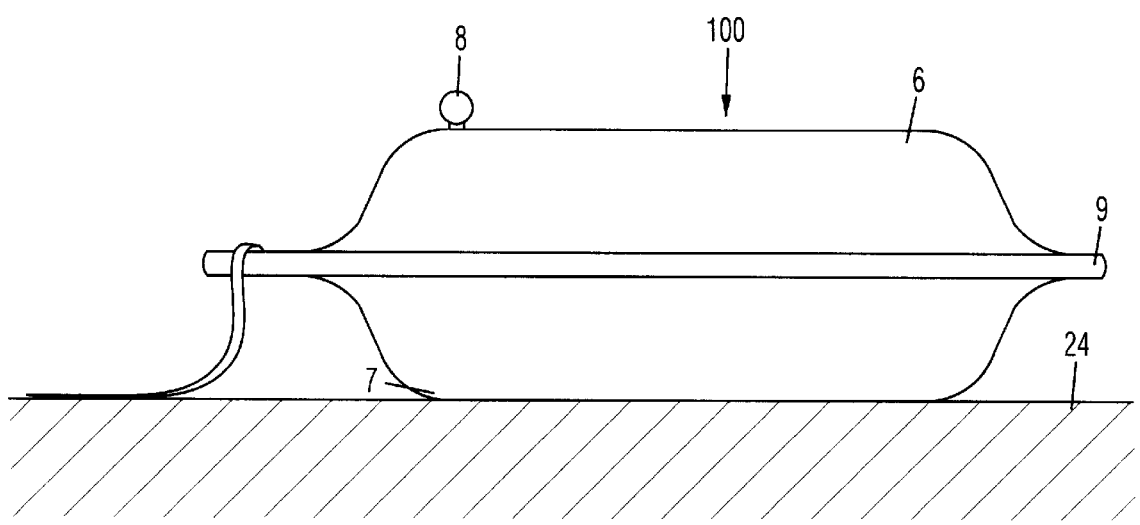
FIG. 3 is a side view of the present invention

FIG. 3 shows the present invention 100 in its use position with flat surface 7 in contact with the ground or floor 24.

Figure 4:
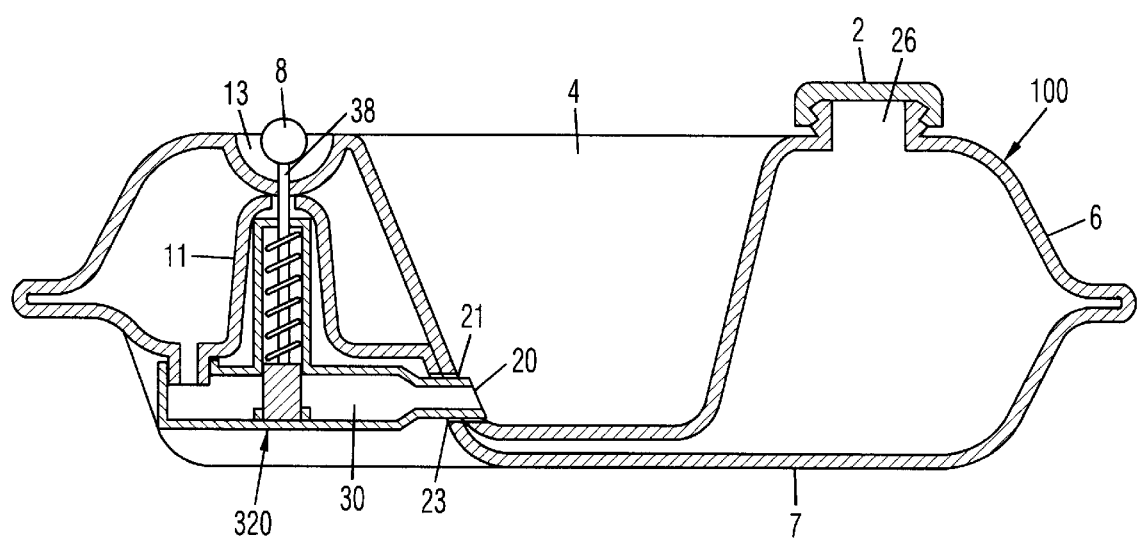
FIG. 4 is a side section view of the present invention
Figure 5:
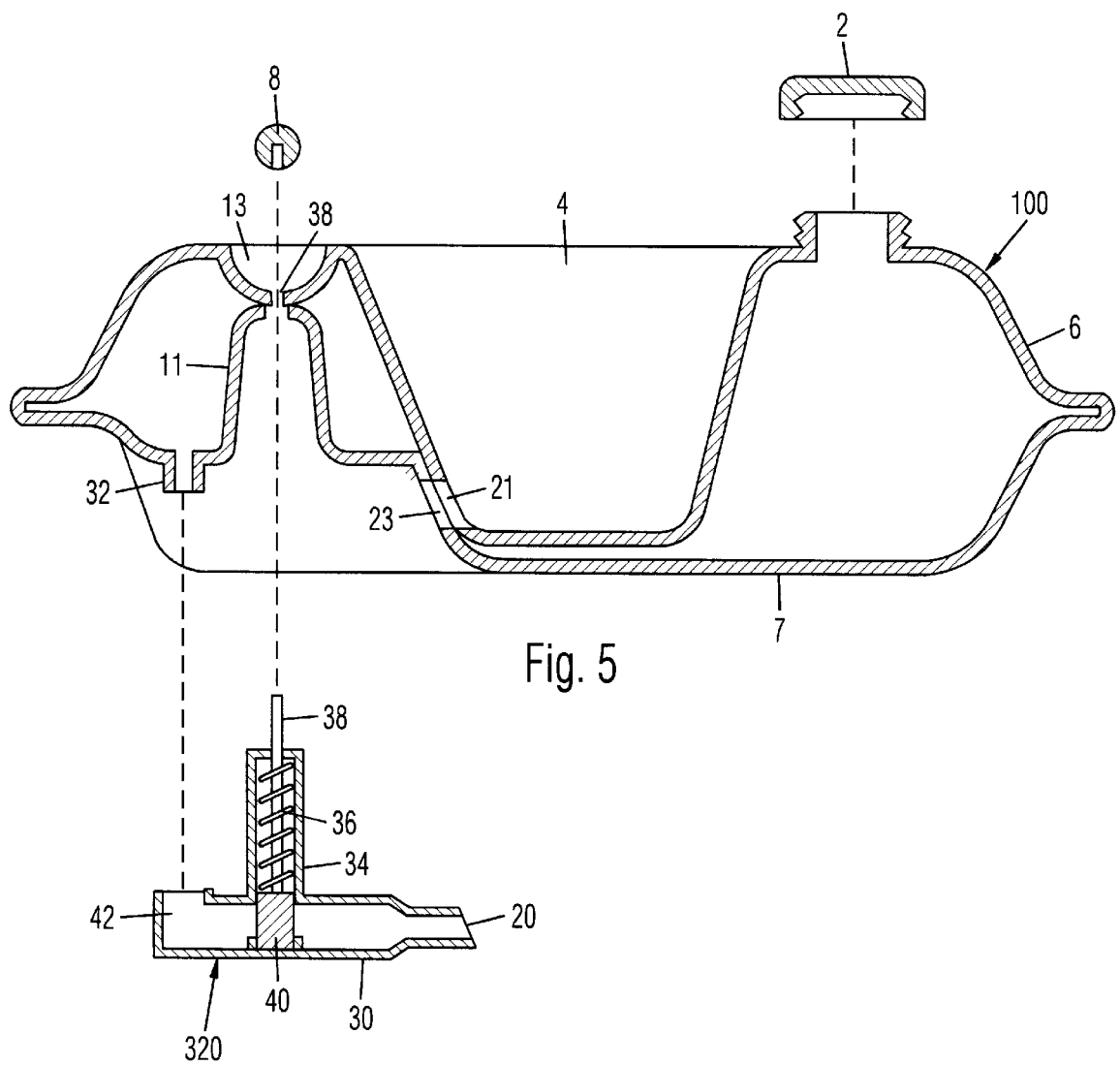
FIG. 5 is an exploded side section view of the present invention

FIG. 4 shows a side section view of the present invention 100. The bottle or vessel of the present invention 100 is blow molded of high density or similar plastic material. The vessel, comprised of top portion 6 and bottom portion 7 is molded as one integral shape. A molded in recess 11 located in the bottom portion 7 allows room for a valve assemble 320 to be inserted. Bottom portion 7 and top portion 6 meet at knob well section 13. As a secondary operation a hole is drilled in the center or section 13 to allow valve post 38 to exit. Additionally, holes 21, 23 are drilled at the bottom of bowl 4 and recess 11 to allow tube 20 of valve assembly 320 to be able to deliver water when knob 8 is lifted. Fill cap 2 should be loosened by the user when the user wants to fill the bowl 4 with water so that air can replace the exiting water thereby increasing water flow. FIG. 5 shows how valve assembly 320 inserts into the bottom 7 of vessel 100. Valve inlet 42 plugs onto nipple 32 located in the recess 11 of bottom surface 7. Valve stem 38 is inserted into hole 38. Spring 36 holds resilient sliding valve member 40 the the closed position as shown. When the user lifts attached knob 8, valve stem 38 and attached resilient sliding valve member 40 are also lifted thereby allowing water to pass from the inside of bottle 100 through horizontal and exit through tip 20 thereby allowing bowl 4 to be filled with water. The above described construction allows for inexpensive manufacture of the present invention because the blow molded container 100 can be made in one piece and does not require the gluing or welding of two halves.

In the above described and illustrated way, a person can take his or her pet on a trip away from home and carry a convenient pet water feeding device that is a combined water carrying vessel and bowl. Of course the above described invention can also be used at home.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Combination pet water bottle and bowl comprising:

a molded plastic vessel capable of retaining water or other liquid having one flat wall and an opposing parallel second wall having a bowl shaped depression integral to said second wall;

a replaceable and removable cap integral to said vessel to enable the user to fill the vessel with water or the like;

a spring biassed water sealing valve assembly comprised of a resilient stopper and a slidable valve stem that allows water to pass from the inside of the vessel to the bottom of the bowl by use of a pull handle located at the top of the valve stem external to the vessel body;

a means of locating said valve assembly so that said vessel can be blow molded using common molding techniques without the need to glue or weld two vessel halves together; and a molded in means for attaching a shoulder strap to said vessel.

* * * * *